US010963528B2

(12) United States Patent
Meyerzon et al.

(10) Patent No.: US 10,963,528 B2
(45) Date of Patent: *Mar. 30, 2021

(54) PERSONALIZED CONTENT SUGGESTIONS IN COMPUTER NETWORKS

(71) Applicant: Microsoft Technology Licensing, LLC, Redmond, WA (US)

(72) Inventors: Dmitriy Meyerzon, Bellevue, WA (US); Nikita Voronkov, Bothell, WA (US); Aninda Ray, Sammamish, WA (US); Alina Skarbovsky, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 50 days.

This patent is subject to a terminal disclaimer.

(21) Appl. No.: 16/543,905

(22) Filed: Aug. 19, 2019

(65) Prior Publication Data

US 2019/0377767 A1 Dec. 12, 2019

Related U.S. Application Data

(63) Continuation of application No. 15/195,019, filed on Jun. 28, 2016, now Pat. No. 10,423,683.

(60) Provisional application No. 62/330,700, filed on May 2, 2016.

(51) Int. Cl.
G06F 16/9535 (2019.01)
G06F 16/248 (2019.01)
G06F 16/9032 (2019.01)

(52) U.S. Cl.
CPC ........ *G06F 16/9535* (2019.01); *G06F 16/248* (2019.01); *G06F 16/90328* (2019.01)

(58) Field of Classification Search
CPC ............... G06F 16/9535; G06F 16/248; G06F 16/90328
USPC ......................................................... 707/732
See application file for complete search history.

(56) References Cited

U.S. PATENT DOCUMENTS

| 10,235,429 | B2* | 3/2019 | Meehan | G06F 16/248 |
| 2011/0029509 | A1* | 2/2011 | Kumthekar | G06F 16/9535 707/723 |
| 2015/0248410 | A1* | 9/2015 | Stickler | H04L 67/10 707/728 |
| 2017/0024424 | A1* | 1/2017 | Almohizea | G06F 16/248 |

OTHER PUBLICATIONS

"Office Action Issued in European Patent Application No. 17733166.7", dated Jan. 13, 2020, 6 Pages.

(Continued)

*Primary Examiner* — Hicham Skhoun
(74) *Attorney, Agent, or Firm* — Liang IP, PLLC

(57) ABSTRACT

Computer systems, devices, and associated methods of providing personalized content suggestion are disclosed herein. In one embodiment, a method performed by a search engine includes receiving an indication to perform a search for content items from a member. In response to the received indication, the search engine generates a list of content items represented as nodes in an interaction graph. The nodes uniquely correspond to the member from whom the indication to perform the search is received. In the nodes, at least one is indirectly connected to a node representing the member via at least one other node in the interaction graph.

20 Claims, 7 Drawing Sheets

(56) References Cited

OTHER PUBLICATIONS

"Summons to Attend Oral Proceedings Issued in European Patent Application No. 17733166.7", dated Oct. 5, 2020, 8 Pages.

* cited by examiner

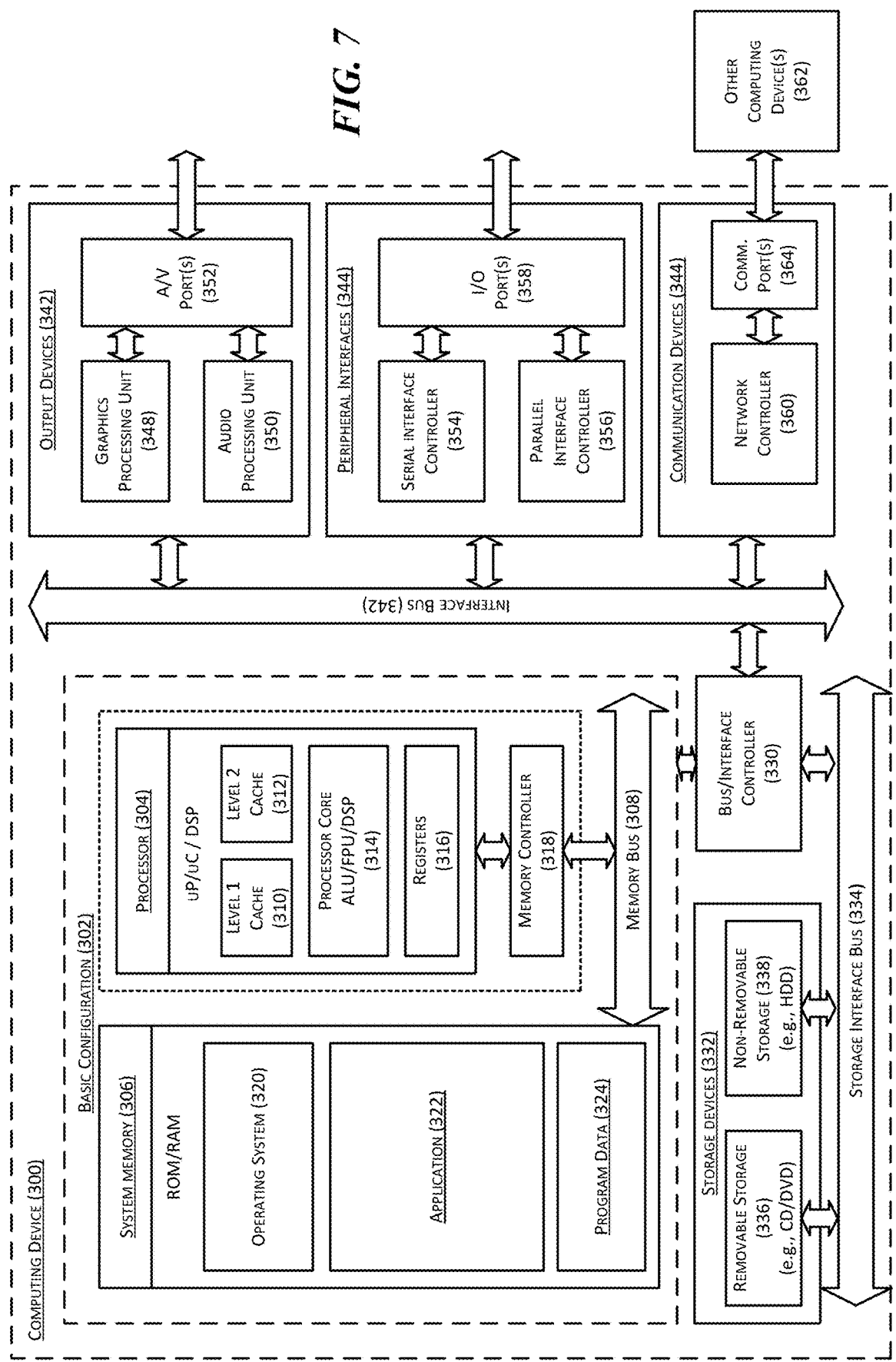

PERSONALIZED CONTENT SUGGESTIONS IN COMPUTER NETWORKS

CROSS-REFERENCE TO RELATED APPLICATION(S)

This application is a continuation of and claims priority to U.S. patent application Ser. No. 15/195,019, filed Jun. 28, 2016, which claims priority to U.S. Provisional Application No. 62/330,700, filed on May 2, 2016, the disclosure of which is incorporated herein in its entirety.

BACKGROUND

Corporations, schools, charities, government offices, and other types of enterprises often deploy private computer networks commonly referred to as intranets. Such intranets can allow members of an enterprise to securely share information within the enterprise. For example, an intranet can include a file management system that is configured to store, track, or otherwise manage internal documents of an enterprise. In contrast, the term "internet" typically refers to a public computer network among individuals and enterprises. One example internet contains billions interconnected of computer devices worldwide based on the TCP/IP protocol, and is commonly referred to as the Internet.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Intranets can provide members of an enterprise ability to search for various types of resources within the enterprise. For example, an intranet can include one or more repositories that store documents, videos, audios, or other types of content items. The intranet can also include a search engine to allow members of the enterprise to search and retrieve the stored content items. Such searches can be based on, for example, keywords, alternate phrases, or other suitable criteria. The search engine can then return a list of content items to the members as search results. In some implementations, the search engine can also provide content suggestions before a member starts a search. For example, as the member starts to type a search query, the search engine can provide certain suggested content items or prior search queries based on the incomplete search query before the member initiates the search by, for instance, pressing the "return" key.

One drawback of the foregoing arrangements for providing content suggestions is possible low relevancy of the suggested content items because search engines typically do not take into account interactions of the members in the enterprise during a search. As such, a document relevant only to one department may be returned in the content suggestions based on keywords even though a member is searching for a document relevant to another department. Thus, locating the relevant document or content item can be time consuming, and thus can reduce productivity of the members in the enterprise.

Several embodiments of the disclosed technology can improve relevancy of content suggestions by suggesting content items based on a member's "footprint" in an enterprise, social network, or other suitable types of organization. In certain embodiments, a member's footprint in an enterprise can include various types of historical interactions of the member in the enterprise. For example, the member's footprint can include past interactions with other members of the enterprise, with certain websites on the intranet, or with certain documents available on the intranet. In other embodiments, the member's footprint can also include the member's position within the organization of the enterprise such as an associated division, department, group, team, etc. In further embodiments, the member's footprint can also include an expertise of the member such as in software programming, finance, accounting, or other suitable disciplines. In certain embodiments, the member's footprint can be organized as a graph having nodes representing the members of the enterprise. The members' interactions, organizational positions, expertise, or other member specific information can be recorded and linked as nodes to the members on the graph.

Upon receiving an indication from the member for conducting a search (e.g., clicking on a search box), a search engine can initially identify the member who is conducting the search based on, for example, login information, cookies, or other suitable identifiers. The search engine can then locate a node in the graph that represents the identified member, and query the graph around the located node in the graph for a list of content items and/or a listed members having interactions with the identified member. In certain embodiments, the search engine can identify content items that are directly linked to the identified member. Examples of such content items include documents or websites the member has interacted with in the past.

The search engine can also identify content items that are indirectly linked to the identified member. For example, the search engine can identify documents linked to other members, but not directly interacted with by the identified member. The other members can be linked to the identified member due to previous interactions such as via emailing one another, co-authoring a document, attending meetings, etc.. In another example, the search engine can also identify one or more documents contained on a website linked to the identified member who has not directly interacted with the one or more documents. In certain embodiments, the search engine can dynamically adjust a level of the foregoing indirect searching. For example, after searching based on a first level of indirectness, the search engine can compare a number of content items in the content suggestions to a threshold. In response to determining that the number of content items is below a threshold, the search engine can continue the search based on a higher level of indirectness.

Once the search engine identifies a list of content items based on the member's footprint in the graph, in certain embodiments, the search engine can output one or more of these content items to the member as content suggestions even before receiving a search query from the member. In other embodiments, the search engine can also group the list of content items based on category, time of access, or other suitable criteria. In further embodiments, once at least a portion of a search query is received from the member, the search engine can filter the list of content items and dynamically update the outputted list of content suggestions to the member.

Several embodiments of the disclosed technology can improve relevancy of content suggestions by focusing searching operations around a member who is conducting the search. Without being bound by theory, it is believed that a member's previous interactions within an enterprise can inform on potential relevant content items the member is searching. As such, by focusing content suggestions based on the identity of the member who is requesting the search, the search engine can locate and suggest relevant content items more efficiently than purely based on search queries from the member. Thus, several embodiments of the disclosed technology can provide improved user experience and/or increased productivity within the enterprise in comparison to conventional techniques.

BRIEF DESCRIPTION OF THE DRAWINGS

FIG. 7 is a computing device suitable for certain components of the computing system in FIG. 1.

DETAILED DESCRIPTION

Figure 1:
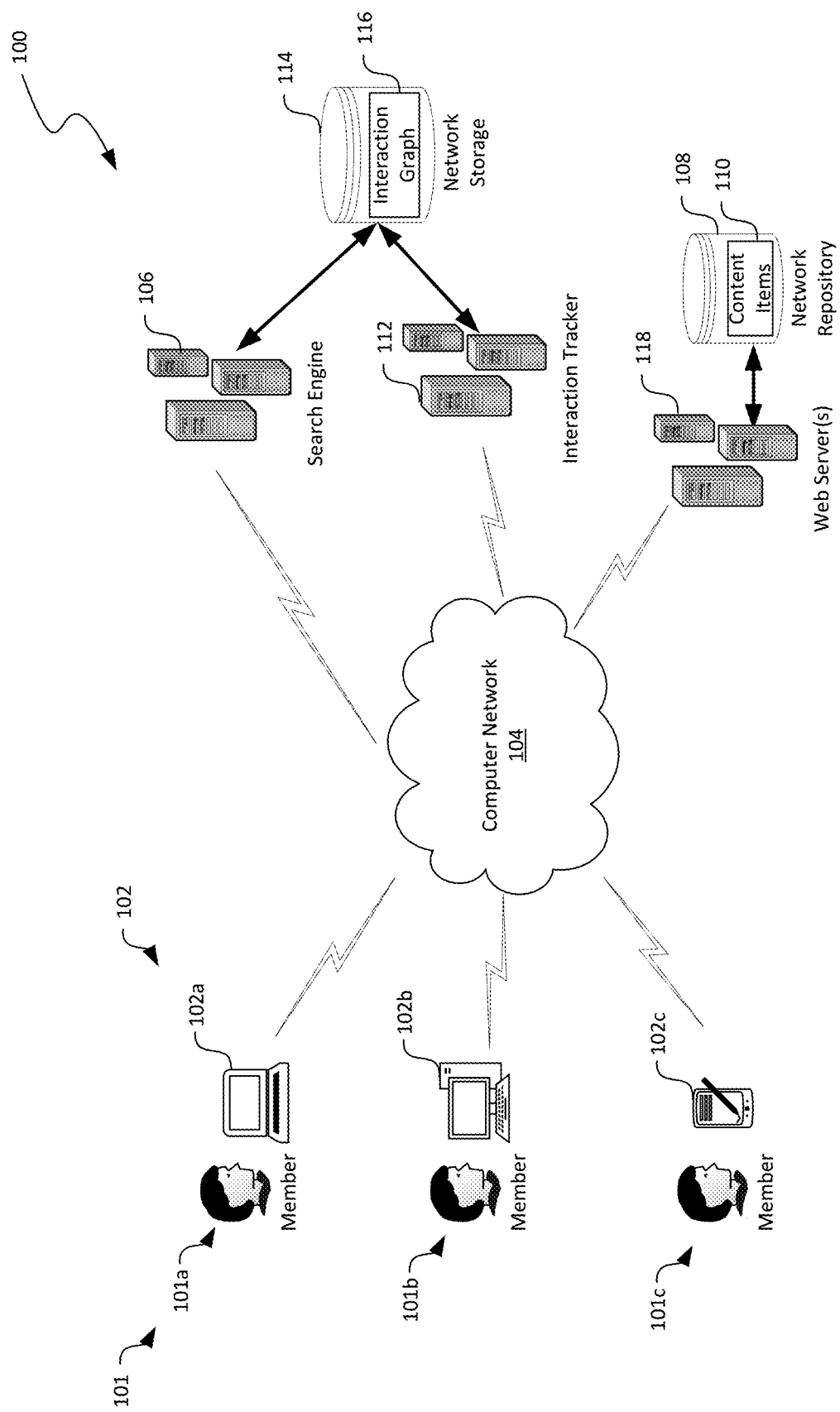
FIG. 1 is a schematic diagram illustrating a computing system having personalized content suggestion in accordance with embodiments of the disclosed technology.

Certain embodiments of systems, devices, components, modules, routines, data structures, and processes for personalized content suggestions are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-7.

As used herein, the term "content item" generally refers to an item of information resource accessible via a computer network. For example, a content item can include a document containing text, images, sounds, videos, or animations stored in a network repository and accessible via the computer network. In another example, a content item can also include a website with one or more webpages accessible via the computer network. In additional examples, content items can include blog sites, discussion forums, electronic commerce sites, or other suitable types of resources. Also used herein, the phrase "content suggestion" can include a list of content items suggested to a user based on no search query or based on an incomplete search query from the user before the user initiating the search based on the search query by, for instance, actuating the "search" icon, pressing a "return" key, or via other suitable actions.

Also used herein, the term "interaction graph" generally refers to a graphical representation having multiple nodes each representing a user or a content item interacted with by the users. The graphical representation can also include an interaction indicator (e.g., a unidirectional arrow or bi-directional arrow) between two nodes indicating an interaction relationship therebetween. For example, if a user interacted with a content item (e.g., edited a document, viewed a video, etc.), such interaction can be represented by a unidirectional arrow between a node representing the user and another node representing the content item. In another example, if a user interacted with another user (e.g., via online posts, emails, phone calls, etc.), such interaction can be represented by a unidirectional or bi-directional arrow between nodes representing the users. An example of interaction graph is discussed in more detail below with reference to FIGS. 3 and 5A-5C.

In addition, as used herein, the term "indirectness" generally refers to connectivity in an interaction graph between two nodes via one or more other nodes, and in contrast to being directly connected with each other. A "level of indirectness" generally refers to a number of other nodes or hops needed to reach one node from another. For example, if a first node can be reached from a second node via a single third node, then the level of indirectness between the first and second nodes can be referred to as a first level of indirectness. Similarly, in another example, if the first node can be reached from the second node via two other nodes, then the level of indirectness between the first and second nodes can be referred to as a second level of indirectness.

Certain computer networks such as intranets or social networks can provide users or members the ability to search for various types of content items available on the computer networks. For example, an intranet can include one or more repositories that store text, videos, audios, or other types of documents. The computer networks can also provide a search engine to allow users to query the stored content items. Such searches can be based on, for example, keywords, alternate phrases, or other suitable criteria. In some computing systems, the search engine can provide content suggestions before a member starts the search. For example, as the member starts to type a search string, the search engine can provide certain suggested content items based on the incomplete search string before the member initiates the search by, for instance, pressing the "return" key.

One drawback of the foregoing arrangement is possible low relevancy of the content items in the content suggestions because search engines typically do not take into account interactions of the members for the queries. As such, a document relevant to one subject area may be returned in the content suggestions based on keywords even though another user is searching for a document relevant to another subject area. Thus, locating the relevant document or content item can be time consuming, and thus can reduce productivity of members in the enterprise or negatively affect user experience.

Several embodiments of the disclosed technology can improve relevancy of content suggestions by searching for and suggesting content items based on a member's "footprint" in an enterprise, in a social network, or in other suitable types of computer network. In certain embodiments, a member's footprint on a computer network can include various types of historical interactions of the member represented as an interaction graph. For example, the member's footprint can include past interactions with other members of the enterprise, with certain websites on the intranet, or with certain documents available on the computer network. During a search for suggested content items, a search engine can locate suggested content items around a node representing a member requesting the search to improve relevancy of returned content suggestions, as described in more detail below with reference to FIGS. 1-7.

FIG. 1 is a schematic diagram illustrating a computing system 100 implementing personalized content suggestion in accordance with embodiments of the disclosed technology. As shown in FIG. 1, the computing system 100 can include a computer network 104 interconnecting client devices 102, a search engine 106, an interaction tracker 112, and one or more web servers 118. The computer network 104 can include an enterprise intranet, a social network, the Internet, or other suitable types of network.

The computing system 100 can also include a network repository 108 operatively coupled to the web servers 118 and a network storage 114 operatively coupled to the search engine 106 and the interaction tracker 112. As shown in FIG. 1, the network repository 108 can be configured to store records of content items 110 accessible via the computer network 104. The network storage 114 can be configured to store records of an interaction graph 116 containing data representing interaction among the members 101 and interaction between the individual members 101 and the content items 110.

Even though particular components and associated arrangements of the computing system 100 are shown in FIG. 1, in other embodiments, the computing system 100 can include additional and/or different components. For example, in certain embodiments, the network repository 108 and the network storage 114 can be combined into a single physical or logical storage space. In other embodiments, the computing system 100 can also include caching servers, load balancers, or other suitable components.

The client devices 102 can individually include a computing device that facilitates access to the network repository 108 via the computer network 104 by members 101 (identified as first, second, and third members 101a-101c). For example, in the illustrative embodiment, the first client device 102a includes a laptop computer. The second client device 102b includes a desktop computer. The third client device 102c includes a tablet computer. In other embodiments, the client devices 102 can also include smartphones or other suitable computing devices. Even though three members 101 are shown in FIG. 1 for illustration purposes, in other embodiments, the computing system 100 can facilitate any suitable number of members 101 access to the network repository 108 via the computer network 104.

In certain embodiments, the search engine 106, the interaction tracker 112, and the web servers 118 can each include one or more interconnected computer servers, as shown in FIG. 1. In other embodiments, the foregoing components of the computing system 100 can each include a cloud-based service hosted on one or more remote computing facilities such as datacenters. In further embodiments, certain components (e.g., the web servers 118) may be omitted from the computing system 100 and be provided by external computing systems (not shown).

The web servers 118 can be configured to provide one or more websites accessible by the members 101 via the computer network 104. For example, in one embodiment, the web servers 118 can be configured to provide an enterprise internal website that allows the members 101 to securely exchange information and to cooperate on performing tasks. In other embodiments, the web servers 118 can also be configured to provide a social network website that allows the members 101 to post content items 110, comment on one another's content items 110, share and/or recommend content items 110 with additional members 101, or perform other suitable actions. In certain embodiments, the web servers 118 can also be configured to receive, store, catalog, or otherwise manage the content items 110 in the network repository 108. In other embodiments, the computing system 100 can further include a database server (not shown) or other suitable components configured to perform the foregoing functions.

The interaction tracker 112 can be configured to generate, update, or otherwise manage records of interactions (i) among the members 101 and (ii) between the individual members 101 and one or more content items 110 stored in the network repository 108. For example, in one embodiment, the interaction tracker 112 can record interactions between pairs of the members 101 via online postings, emails, phone calls, text messages, online chats, or other suitable interactions. In another embodiment, the interaction tracker 112 can also record interactions between the individual members 101 and one or more of the content items 110. Such interactions can include creating, editing, saving, viewing, commenting, or performing other suitable actions by the members 101 on the content items 110. In further embodiments, the interaction tracker 112 can also record organizational positions, expertise, or other suitable information related to the individual members 101, as described in more detail below with reference to FIGS. 2 and 3.

The search engine 106 can be configured to provide personalized content suggestions to the member 101 based on the interaction graph 116 in the network storage 114. In certain embodiments, the search engine 106 can be configured to receive an indication from one of the members 101 to perform a search for content items 110. Examples of such indication can include receiving a click on a search box (not shown) displayed on a webpage or detecting hovering of a cursor over the search box on the webpage. In response, the search engine 106 can be configured to query the interaction graph 116 to generate a list of suggested content items 110 uniquely corresponding to the member 101 based on the identity of the member 101. The list of content items 110 can also correspond to an incomplete search query entered by the member by searching, for example, compiled keywords in metadata associated with each node in the interaction graph 116. The search engine 106 can then transmit at least some of the generated list of content items 110 to the member 101 via the computer network 104 as personalized content suggestion. Various embodiments of components and operations of the search engine 106 are discussed in more details below with reference to FIGS. 4-5C.

Figure 2:
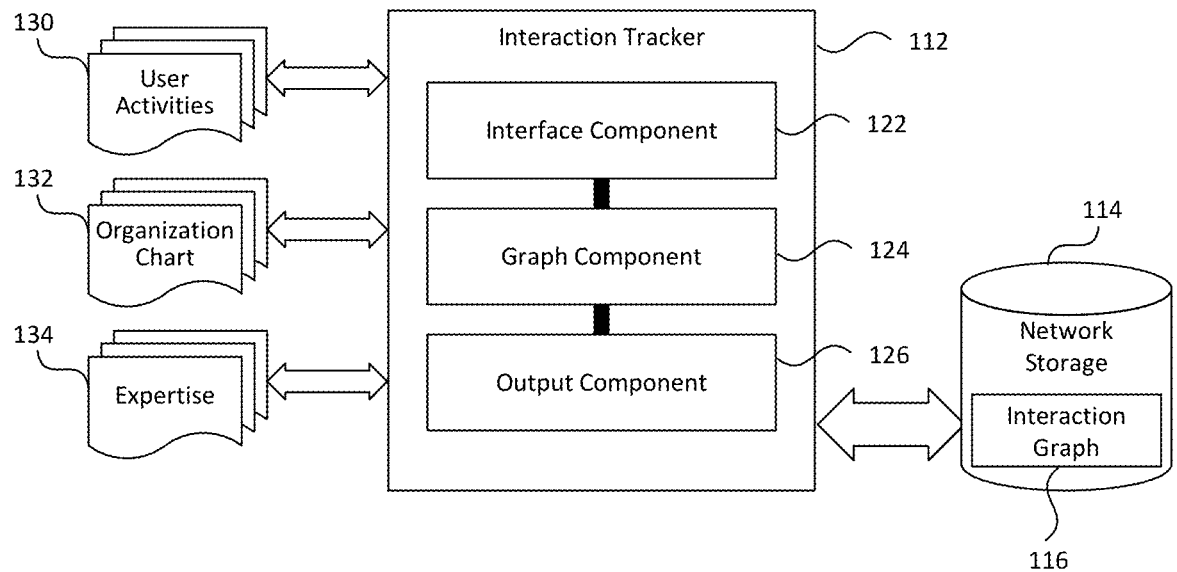
FIG. 2 is a schematic diagram illustrating certain hardware/software components of the interaction tracker of FIG. 1 in accordance with embodiments of the disclosed technology.

FIG. 2 is a schematic diagram illustrating certain hardware/software components of the interaction tracker 112 of FIG. 1 in accordance with embodiments of the disclosed technology. As shown in FIG. 2, the interaction tracker 112 can include an interface component 122, a graph component 124, and an output component 126 operatively coupled to one another. In certain embodiments, the interface component 122 can be configured to detect user activities 130 via, for example, tracking messages, metadata associated with the content items 110, or via other suitable techniques. In other embodiments, the interface component 122 can also receive an organization chart 132, records of expertise of the members 101 (FIG. 1), or other suitable information from, for example, an administrator of the computing system 100. The interface component 122 can then provide the received user activities 130, organization chart 132, expertise 134, or other suitable information to the graph component 124. The graph component 124 can be configured to generate the interaction graph 116 based on the received information from the interface component 122, and the output component 126 can output or update the generated interaction graph 116 in the network storage 114, as discussed in more detail below with reference to FIG. 3.

Figure 3:
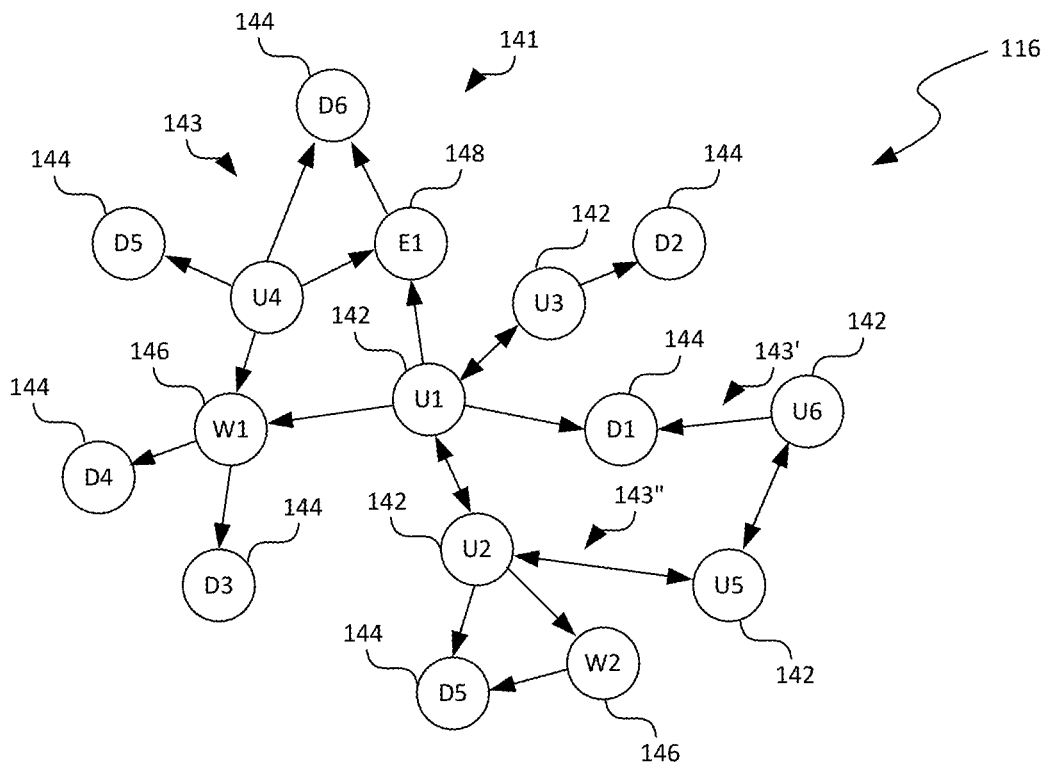
FIG. 3 is a schematic diagram illustrating an interaction graph that the interaction tracker of FIG. 1 can generate in accordance with embodiments of the disclosed technology.

FIG. 3 is a schematic diagram illustrating an example interaction graph 116 that the interaction tracker 112 of FIG. 2 can be configured to generate in accordance with embodiments of the disclosed technology. As shown in FIG. 3, the interaction graph 116 can include multiple types of nodes 141 interconnected to one another with interaction indicators 143. For example, the interaction graph 116 can include member nodes 142 (shown in FIG. 3 as U1-U6), document nodes 144 (shown in FIG. 3 as D1-D6), website nodes 146 (shown in FIGS. 3 as W1 and W2), and expertise nodes 148 (shown in FIG. 3 as El). In other examples, the interaction graph 116 can also include organization nodes (e.g., representing a department, team, or group in an enterprise), query nodes (e.g., representing queries previous requested by the members 101 of FIG. 1), or other suitable types of nodes 141.

An interaction indicator 143 can interconnect pairs of the nodes 141. For example, as shown in FIG. 3, a unidirectional arrow 143' can indicate an interaction between a member 101 (e.g., node U1) and a document (e.g., node D1) or a website (e.g., node W1). In another example, a bidirectional arrow can indicate an interaction between one member 101 (e.g., node U1) and another member 101 (e.g., node U3). As shown in FIG. 3, some of the nodes 141 are directly connected to one another. For example, node U1 is directly connected to nodes E1, W1, D1, U2, and U3. Other nodes 141 are indirectly connected to one another. For example, node U1 is indirectly connected to nodes D2, W2, D5, etc. As discussed in more detail below with reference to FIGS. 4-5C, the search engine 106 (shown in FIG. 4) can be configured to generate personalized content suggestion by searching the interaction graph 116.

Figure 4:
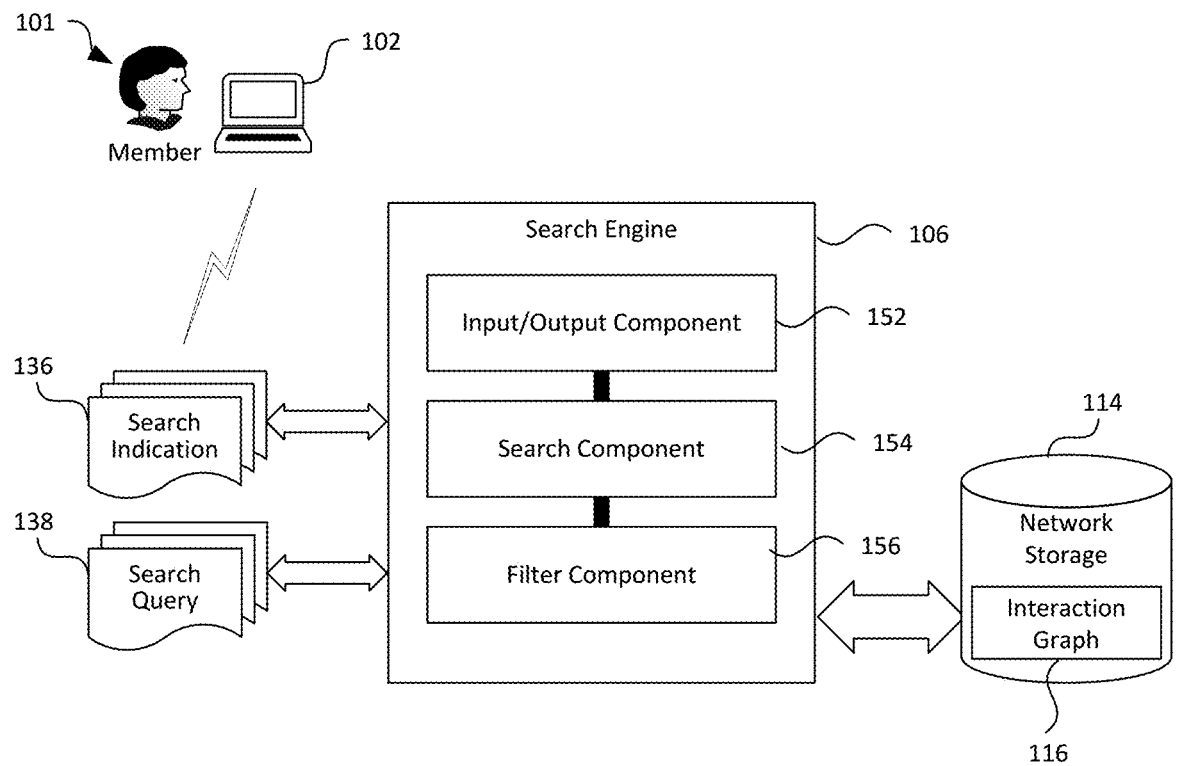
FIG. 4 is a block diagram illustrating hardware/software components of a search engine of FIG. 1 in accordance with embodiments of the disclosed technology.

FIG. 4 is a block diagram illustrating hardware/software components of a search engine 106 suitable for the computing system 100 of FIG. 1 in accordance with embodiments of the disclosed technology. As shown in FIG. 4, the search engine can include an input/output component 152, a search component 154, and a filter component 156 operatively coupled to one another. Even though particular components of the search engine 106 are shown in FIG. 4, in other embodiments, the search engine 106 can also include caching component, sorting component, or other suitable components.

The input/output component 152 can be configured to receive a search indication 136 from a member 101 via a client device 102. In one embodiment, the search indication 136 can include a click on a search box displayed on a webpage, for example, provided by the web servers 118 of FIG. 1. In another embodiment, the search indication 136 can include detecting hovering of a cursor over the search box on the webpage. In further embodiments, the search indication 136 can also include an express command from the member 101 or other suitable types of user input from the member 101.

In response to the received search indication 136, the search component 154 can determine an identity of the member 101 who provided the search indication 136 based on, for example, login information, cookies, or other suitable identifiers. The search component 154 can be configured to generate a list of content items 110 (FIG. 1) based on the identity of the member 101 by querying the interaction graph 116. Various functions and operations of the input/output component 152, the search component 154, and the filter component 156 are described below with reference to FIGS. 5A-5C.

Figure 5A:
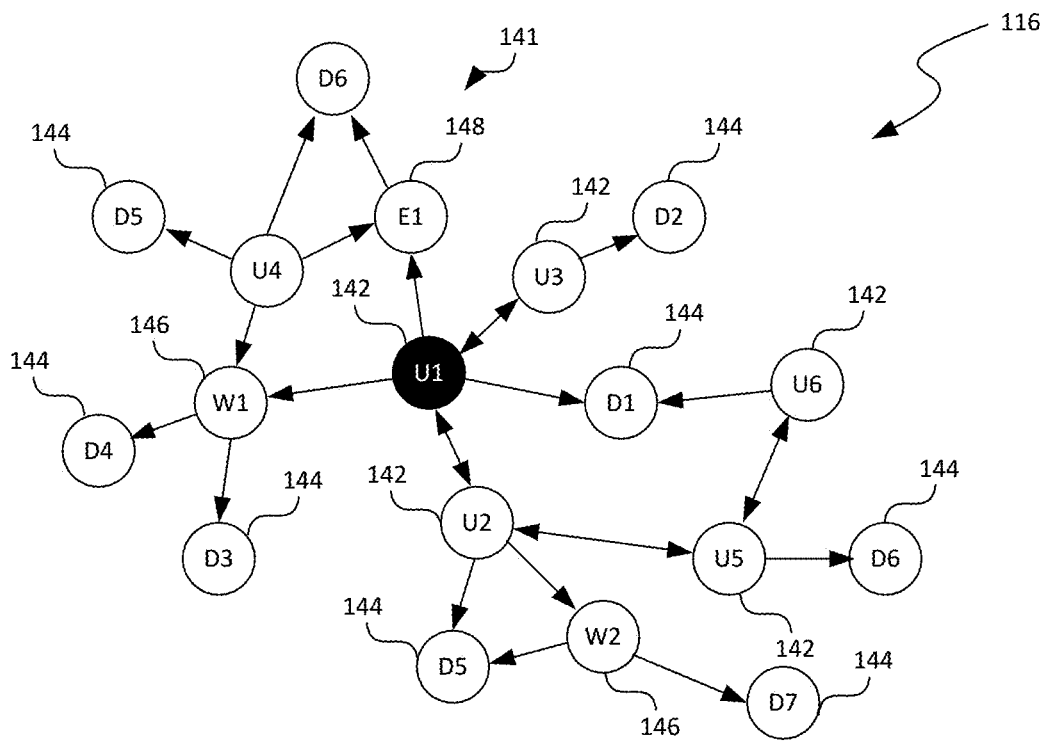
FIGS. 5A-5C are schematic diagrams illustrating personalized content suggestion based on identities of members requesting a search in accordance with embodiments of the disclosed technology.
Figure 5B:
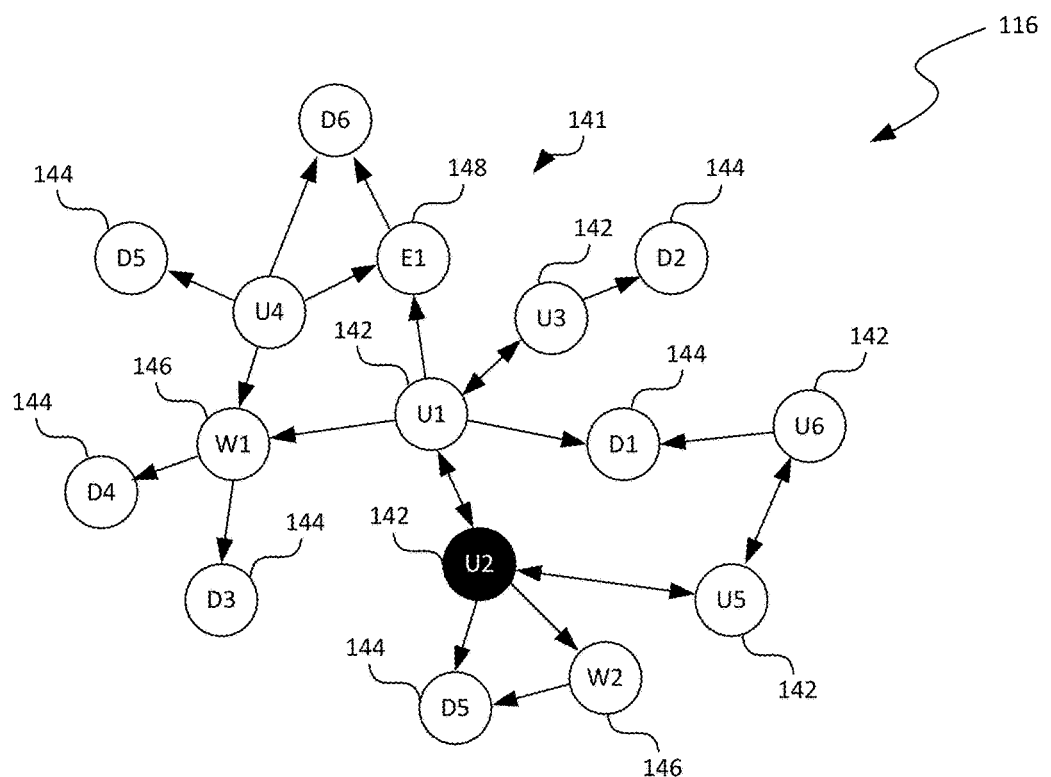
Figure 5C:
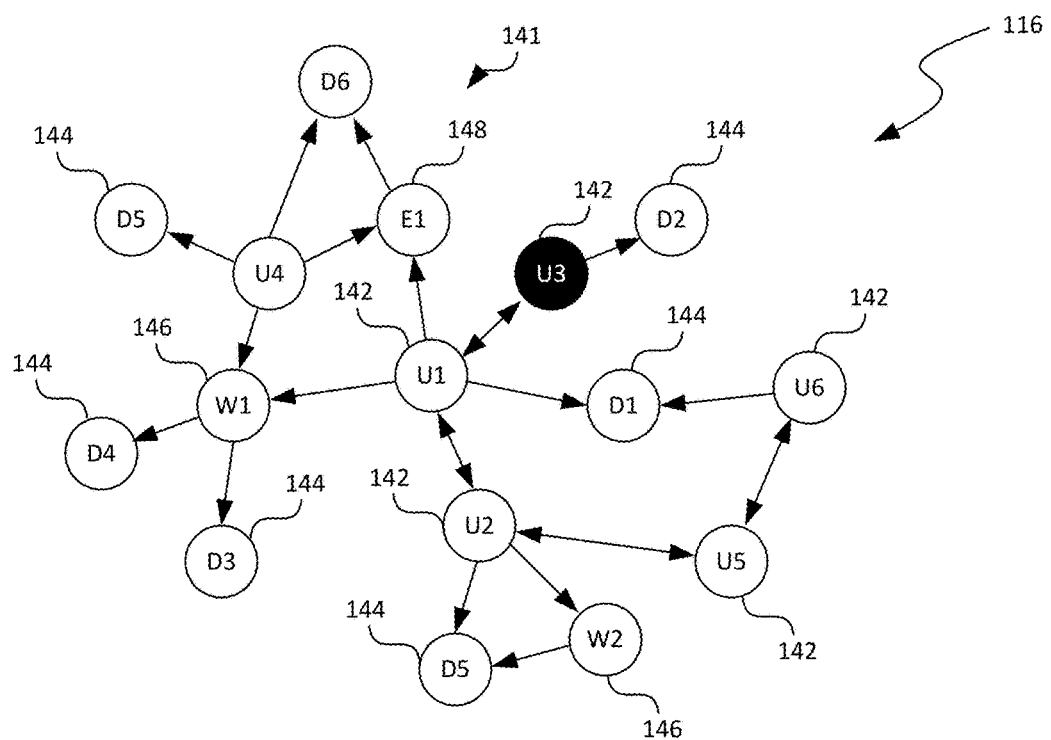

FIGS. 5A-5C are schematic diagrams illustrating personalized content suggestion based on identities of members 101 requesting a search. In the example shown in FIG. 5A, the search component 154 (FIG. 4) can be configured to determine that the member 101 associated with the received search indication 136 corresponds to node U1. In response, the search component 154 can focus the query around node U1, for instance, as indicated by the dark circle in FIG. 5A. The search component 154 can then identify a first group of nodes 141 that are directly connected to node U1, for example, nodes D1, U2, U3, E1, and W1. The search component 154 can also identify a second group of nodes 141 that are indirectly connected to U1, for example, nodes D2, U5, W2, D5, D3, D4, and D6, by, for instance, traversing the one or more interaction indicators 143, querying for all nodes 141 with a first level of indirectness, or via other suitable techniques.

The search component 154 can also be configured to refocus queries of the interaction graph 116 when additional search indications 136 from other members 101 are received. For instance, in the example shown in FIG. 5B, the search component 154 can be configured to determine that the member 101 associated with the received additional search indication 136 corresponds to node U2. In response, the search component 154 can refocus the query around node U2 as indicated by the dark circle in FIG. 5B. The search component 154 can then identify a first group of nodes 141 that are directly connected to node U2, for example, nodes U1, D5, W2, and U5. The search component 154 can also identify a second group of nodes 141 that are indirectly connected to U2, for example, nodes D1, U3, E1, and W1.

In the example shown in FIG. 5C, the search component 154 can be configured to determine that the member 101 associated with the received yet another search indication 136 corresponds to node U3. In response, the search component 154 can refocus the query around node U3 as indicated by the dark circle in FIG. 5C. The search component 154 can then identify a first group of nodes 141 that are directly connected to node U3, for example, nodes U1 and D2. The search component 154 can also identify a second group of nodes 141 that are indirectly connected to U2, for example, nodes E1, W1, D1, and U2.

In certain embodiments, the search component 154 can also determine whether a number of the first and/or second groups of nodes 141 exceeds a threshold (e.g., 5, 10, 20, 30, 40, etc.). In certain embodiments, the threshold can be determined based on an available display area on the webpage having the search box. In other embodiments, the threshold can be set by a network administrator or other suitable entities. In response to determining that the number of nodes 141 in the first and/or second groups exceed the threshold, the search component 154 can terminate the search, for instance, in the example shown in FIG. 5A. Alternately, in response to determining that the number of nodes 141 does not exceed the threshold, the search component 154 can extend the search to additional levels of indirectness. For instance, in the example shown in FIG. 5C, the search component 154 can identify additional nodes 141 that are connected to node U3 via two other nodes 141, for example, nodes D6, D3, D4, D5, W2, and U6.

In certain embodiments, the input/output component 152 (FIG. 4) can be configured to return the generated list of nodes 141 as personalized content suggestions to the member 101 even before receiving a search query 138 from the member 101. Once a search query 138 from the member 101 is received, the filter component 156 can then be configured to filter the list of nodes 141 generated by the search component 154 based on, for example, keywords, alternate phrases, or other parameters of the received search query 138. The input/output component 152 can then return the filtered list of nodes 141 to the member 101.

Several embodiments of the disclosed technology can improve relevancy of content suggestions by focusing searching operations around a member 101 who is requesting the search. Without being bound by theory, it is believed that previous interactions of a member 101 within an enterprise or social network can help locating potentially relevant content items 110 (FIG. 1) the member 101 is searching. As such, by focusing searching operations based on a node 141 (FIGS. 5A-5C) corresponding to the member 101 who is requesting the search, the search engine 106 can locate relevant content items 110 more efficiently than searching purely based on the search query 138. Thus, productivity within the enterprise and user experience in a social network can be improved in comparison to conventional techniques.

Figure 6A:
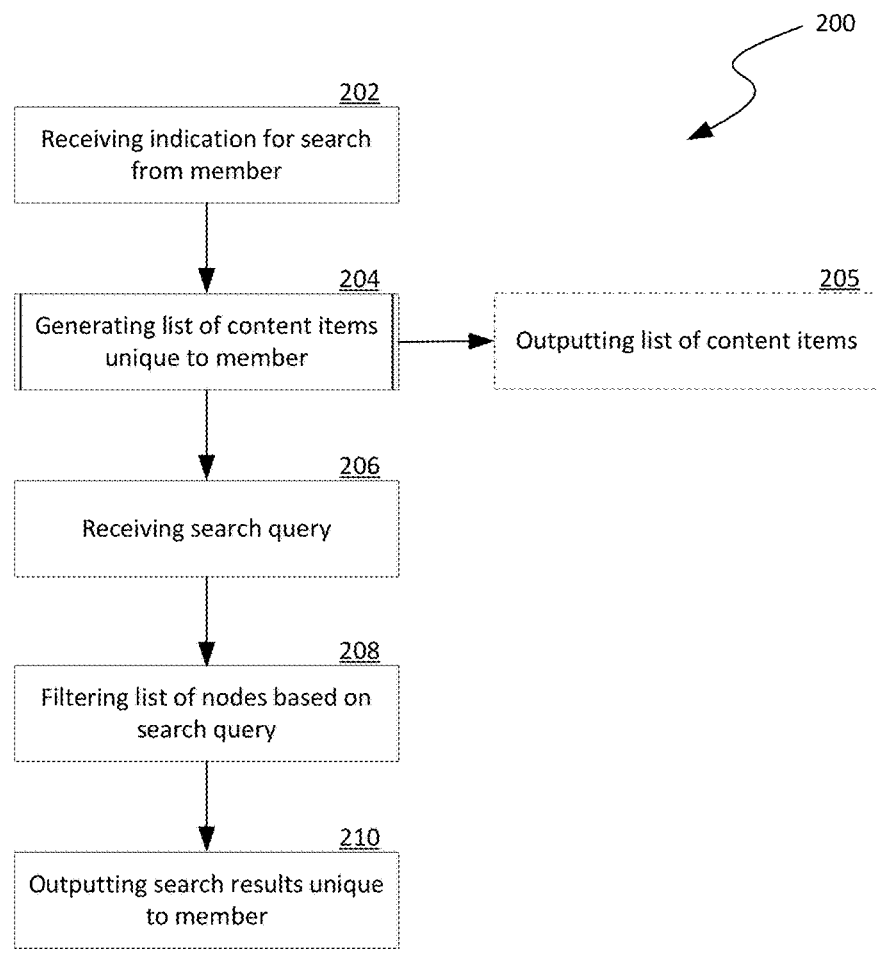
FIGS. 6A-6D are flowcharts illustrating various processes of providing personalized content suggestion in accordance with embodiments of the disclosed technology.

FIG. 6A is a flowchart illustrating a process 200 of providing personalized content suggestion in accordance with embodiments of the disclosed technology. Even though embodiments of the process 200 are described in the context of the computing system 100, in other embodiments, the process 200 can also be implemented in computing systems with additional and/or different components.

As shown in FIG. 6A, the process 200 can include receiving indication for search from a member 101 (FIG. 1) at stage 202. The process 200 can then include generating a list of content items that is unique to the member 101 at stage 204. In certain embodiments, generating the list can include generating a list of content items represented as nodes in an interaction graph such as those shown in FIGS. 5A-5C. In the generated list, at least one of the content items corresponds to a node that is indirectly connected to another node representing the member via at least one other node in the interaction graph. Example embodiments of generating the list of content items are described in more detail below with reference to FIG. 6B.

In certain embodiments, the process 200 can optionally include outputting the generated list of content items even without receiving a search query at stage 205. In certain embodiments, outputting the generated list of content items includes separating at least some of the generated list of content items into two or more groups for display based on corresponding content types or other suitable criteria. In other embodiments, operation at stage 205 can be omitted. As shown in FIG. 6A, the process 200 can also include receiving a search query from the member at stage 206. In response to the received search query, the process 200 can include filtering the generated list of content items from stage 204 based on the received search query at stage 208. Searching by keywords, alternate phrases, date/time of receiving the search query, location from which the search query is received, or other suitable searching techniques can be used to filter the list of content items. The process 200 can then include outputting the filtered list of content items as personalized content suggestion to the member at stage 210.

Figure 6B:
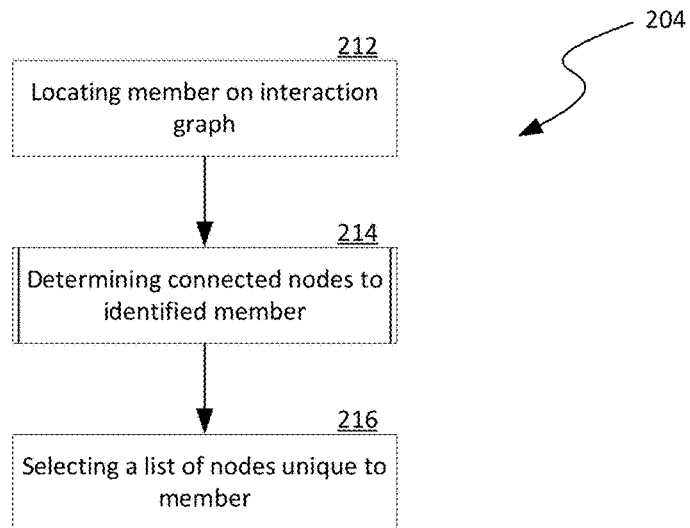

FIG. 6B is a flowchart illustrating example operations for generating the list of content items at stage 204 in FIG. 6A. As shown in FIG. 6B, the operations can include identifying the member from whom the search indication is received and locating a node on the interaction graph as corresponding to the identified member at stage 212. The operations can then include determining directly and indirectly connected nodes to the node representing the identified member at stage 214. Various examples of determining such connected nodes are described in more detail below with reference to FIGS. 6C and 6D.

The operations can further include selecting a list of the identified nodes from stage 214 as personalized content suggestions to the member at stage 216. In certain embodiments, the list of identified nodes can be selected based on, for example, time stamps of last interaction, content types, names of content items, file sizes of content items, or other suitable parameters of the content items. In other embodiments, the list of identified nodes can be selected based on other suitable criteria.

Figure 6C:
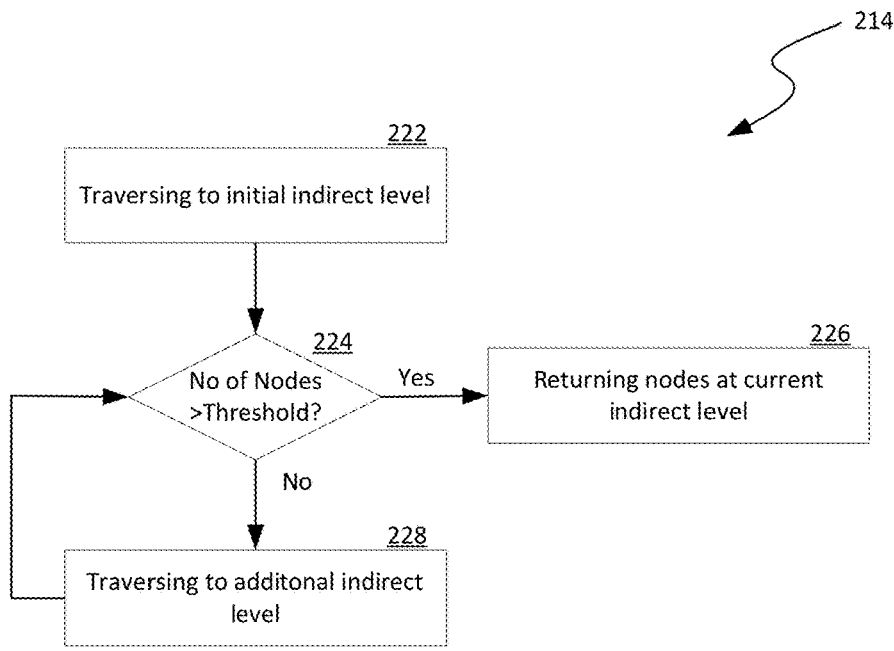

FIG. 6C is a flowchart illustrating operations of determining a list of connected nodes to a node representing a member in accordance with embodiments of the disclosed technology. As shown in FIG. 6C, the operations include traversing to an initial indirect level and identify connected nodes at the initial indirect level at stage 222. For example, the initial indirect level can be a first level of indirectness such as that between node U1 and D2 in FIG. 5A. The operations also include a decision stage 224 to determine if a number of the identified nodes at the first indirect level exceeds a threshold. In response to determining that the number of the identified nodes at the first indirect level exceeds the threshold, the operations can include returning the list of identified nodes at the current indirect level at stage 226. Otherwise, the operations include traversing to additional indirect level at stage 228 to identify additional indirectly connected nodes at stage 228. The process then reverts to determining whether the number of identified node exceeds the threshold at stage 224.

Figure 6D:
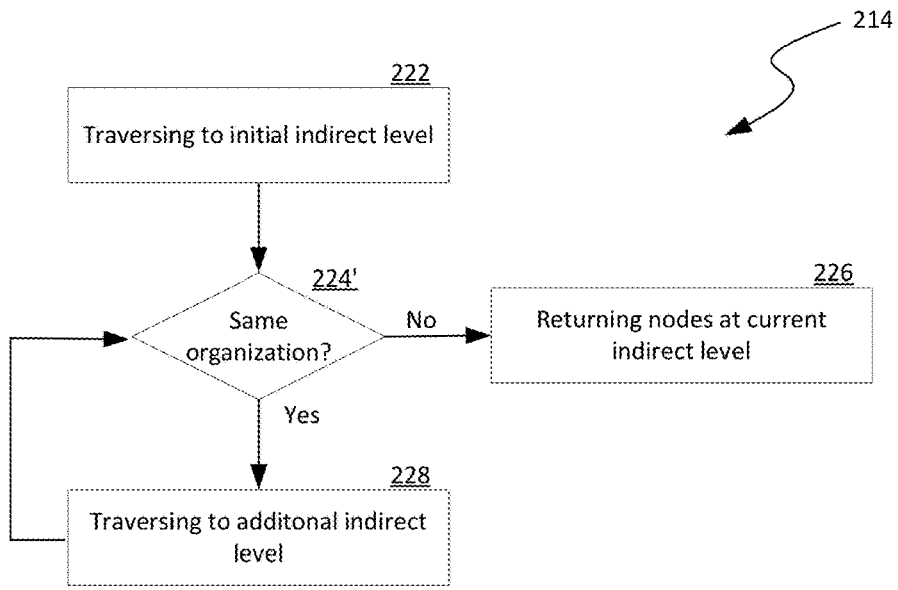

Even though the number of identified nodes is used as a criterion for determining whether to traversing to additional indirect level in FIG. 6C, in other embodiments, other criteria can also be used. For example, as shown in FIG. 6D, the criterion at stage 224' can include a determination whether two nodes representing the members 101 (FIG. 1) belong to the same organization (e.g., company, department, division, team, etc.). In response to determining that the two nodes belong to the same organization, the operations can proceed to traversing to additional indirect level at stage 228; otherwise, the process proceeds to returning the identified nodes at the current indirect level. In further embodiments, the operation at stage 224 can also utilize expertise, physical location, time of interaction, or other suitable parameters for the determination in addition to or in lieu of those shown in FIGS. 6C and 6D.

FIG. 7 is a computing device 300 suitable for certain components of the computing system 100 in FIG. 1. For example, the computing device 300 can be suitable for the search engine 106, the interaction tracker 112, or the web browser 118 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 7 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims.

We claim:

1. A method for providing personalized content suggestions in a computer system accessible to multiple members via a computer network, the method comprising:
   receiving, via the computer network, an input representing an indication to perform a search for content items from a member; and
   in response to receiving the input representing the indication, with the computer system,
      generating a list of content items corresponding to the member by querying, according to a first level of indirectness, an interaction graph having (i) multiple interconnected nodes each representing one of the members or a content item and (ii) a plurality of interaction indicators individually between pairs of the nodes, wherein at least one of the content item in the generated list corresponds to a node that is indirectly connected at the first level of indirectness to another node representing the member;
      determining whether a number of the content items in the generated list is below a preset threshold;
      in response to determining that the number of the content items in the generated list is below the preset threshold, regenerating the list of content items by querying the interaction graph according to a second level of indirectness higher than the first level of indirectness; and
      presenting at least some of the content items in the regenerated list to the member via the computer network.

2. The method of claim 1 wherein receiving the input representing the indication to perform the search includes receiving, from the member, a click on a search box displayed on a webpage or detecting hovering of a cursor over the search box on the webpage.

3. The method of claim 1 wherein providing the personalized content suggestion includes separating at least some of the generated list of content items into two or more groups based on corresponding content types and causing the provided personalized content suggestion to be displayed in the two or more groups.

4. The method of claim 1, further comprising:
subsequent to presenting at least some of the content items,
receiving a search query from the member, the received search query containing a keyword; and
in response to receiving the search query, filtering the content items in the generated list based on the keyword in the search query.

5. The method of claim 1, further comprising:
subsequent to presenting at least some of the content items,
receiving a search query from the member, the received search query containing a keyword;
in response to receiving the search query,
filtering the content items in the generated list based on the keyword in the search query; and
dynamically updating the presented at least some of the content items based on the filtered list of content items.

6. The method of claim 1 wherein:
the member is a first member;
the node representing the member is a first node on the interaction graph; and
the at least one of the nodes indirectly connected to the node representing the member includes a node representing a document or website interacted with by a second member corresponding to a second node directly connected to the first node representing the first member.

7. The method of claim 1 wherein:
the node representing the member is a first node; and
the at least one of the nodes indirectly connected to the node representing the member includes a second node representing a document contained on a website interacted with by the member, wherein the document has not been directly interacted with by the member.

8. The method of claim 1 wherein:
the node representing the member is a first node;
the interaction graph further includes a second node directly connected to the first node, the second node representing an expertise of the member; and
the at least one of the nodes indirectly connected to the node representing the member includes a node representing a document or website interacted with by other members with the same expertise.

9. The method of claim 1 wherein generating the list of content items includes:
identifying, in the interaction graph, a first group of nodes indirectly connected to the node representing the member by a single other node;
determining whether a number of the identified first group of nodes exceeds a threshold; and
in response to determining that the number of the identified first group of nodes does not exceed the threshold, identifying, in the interaction graph, a second group of nodes indirectly connected to the node representing the member by two other nodes.

10. The method of claim 1 wherein:
the member is a first member;
the node representing the member is a first node;
the generate list of content items is a first list of content items; and
the method further includes:
receiving another indication to perform another search for content items from a second member; and
in response to the received another indication, generating a second list of content items by identifying a first group of nodes directly connected to the second member and a second group of nodes indirectly connected to a node representing the second member by at least one another node; and
the generated first list contains content items different than those in the generated second list.

11. A computing system, comprising:
a processor; and
a memory containing instructions executable by the processor to cause the processor to:
upon receiving, via a computer network, an indication to perform a search for content items from a member of an organization having multiple members,
identify a first node corresponding to the member in an interaction graph associated with the organization, the interaction graph having multiple nodes individually representing one of the members or a content item accessible within the organization, individual pairs of the nodes being interconnected by an interaction indicator representing prior interaction therebetween;
identify, according to a first level of indirectness, a set of second nodes indirectly connected to the first node via multiple interaction indicators in the interaction graph;
determine whether a number of the second nodes in the identified set is below a preset threshold;
in response to determining that the number of the second nodes in the identified set is below the preset threshold, regenerating the set by querying the interaction graph according to a second level of indirectness higher than the first level of indirectness; and
present at least some of the identified second nodes in the regenerated set as a search suggestion to the member via the computer network.

12. The computing device of claim 11 wherein to identify the set of the second nodes includes to traverse the interaction graph from the first node to one of the second nodes via an intermediate node connected to both the first and second nodes by first and second interaction indicators, respectively.

13. The computing device of claim 11 wherein:
to identify the set of the second nodes includes to traverse the interaction graph from the first node to one of the second nodes via an intermediate node connected to both the first and second nodes by first and second interaction indicators, respectively;
the second node corresponding to a content item accessible within the organization; and
the intermediate node corresponding to another member who has interacted with the content item represented by the second node.

14. The computing device of claim 11 wherein:
to identify the set of the second nodes includes to traverse the interaction graph from the first node to one of the second node via an intermediate node connected to both the first and second nodes by first and second interaction indicators, respectively;
the second node corresponding to a content item accessible within the organization but not previously interacted with by the member; and
the intermediate node corresponding to a website the member has interacted with before.

15. The computing device of claim 11 wherein the process performed by the processor further includes:
  subsequent to presenting the identified second nodes as a search suggestion to the member, receiving a search query from the member;
    in response to receiving the search query, determining whether one of the second nodes represents a content item that is relevant to the search query; and
    in response to determining that the content item represented by the second node is relevant to the search query, presenting the content item as a search suggestion.

16. The computing device of claim 11 wherein the process performed by the processor further includes:
  subsequent to presenting the identified second nodes as a search suggestion to the member,
  receiving a search query from the member;
    in response to receiving the search query, determining whether one of the second node represents a content item that is relevant to the search query; and
    in response to determining that the content item represented by the second node is not relevant to the search query, removing the content item as a search suggestion to the member.

17. A method for providing personalized content suggestions in a computer system accessible to multiple members via a computer network, the method comprising:
  upon receiving an indication to perform a search from a member,
    identifying the member as a node on an interaction graph having interconnected nodes individually representing one of the members or a content item and linked by interaction indicators representing prior interactions therebetween;
    identifying a list of content items linked to the node representing the member in the interaction graph, wherein at least one of the content item in the list corresponds to a node that is indirectly connected to the node representing the member in the interaction graph via one or more intermediate nodes;
    determining whether a number of the content items in the identified list is below a preset threshold; and
    in response to determining that the number of the content items in the identified list is not below the preset threshold, presenting at least some of the content items in the regenerated list to the member via the computer network.

18. The method of claim 17 wherein:
  identifying the list of content items linked to the node representing the member includes identifying the list of content items linked to the node representing the member according to a first level of indirectness; and
  the method further includes:
    in response to determining that the number of the content items in the identified list is below the preset threshold, regenerating the list of content items by querying the interaction graph according to a second level of indirectness higher than the first level of indirectness.

19. The method of claim 17 wherein identifying the list of content items linked to the node representing the member includes:
  identifying a first group of nodes each directly connected to the node representing the member via an interaction indicator; and
  the method further includes:
    identifying a node from the first group of nodes that corresponds to another member; and
    identifying a second group of nodes directly connected to the identified node from the first group of nodes.

20. The method of claim 17 wherein identifying the list of content items linked to the node representing the member includes:
  identifying a first group of nodes each directly connected to the node representing the member via an interaction indicator;
  the method further includes:
    identifying a node from the first group of nodes that corresponds to a website; and
    identifying a second group of nodes directly connected to the identified node from the first group of nodes, the second group of nodes individually corresponding to a document available on the website.

* * * * *